(12) United States Patent
Buxton et al.

(10) Patent No.: US 11,398,314 B2
(45) Date of Patent: Jul. 26, 2022

(54) DOUBLE NULL LIQUID METAL DIVERTERS

(71) Applicant: Tokamak Energy Ltd, Abingdon (GB)

(72) Inventors: Peter Buxton, Abingdon (GB); Daniel Ibanez, Abingdon (GB)

(73) Assignee: Tokamak Energy Ltd., Abingdon (GB)

( * ) Notice: Subject to any disclaimer, the term of this patent is extended or adjusted under 35 U.S.C. 154(b) by 0 days.

(21) Appl. No.: 17/253,794

(22) PCT Filed: Jun. 21, 2019

(86) PCT No.: PCT/GB2019/051760
§ 371 (c)(1),
(2) Date: Dec. 18, 2020

(87) PCT Pub. No.: WO2020/002888
PCT Pub. Date: Jan. 2, 2020

(65) Prior Publication Data
US 2021/0265068 A1 Aug. 26, 2021

(30) Foreign Application Priority Data
Jun. 27, 2018 (GB) ...................................... 1801512

(51) Int. Cl.
*G21B 1/13* (2006.01)
*G21B 1/05* (2006.01)
(52) U.S. Cl.
CPC ............... *G21B 1/057* (2013.01); *G21B 1/13* (2013.01)
(58) Field of Classification Search
CPC ............. G21B 1/05; G21B 1/057; G21B 1/13
(Continued)

(56) References Cited

U.S. PATENT DOCUMENTS

2010/0063344 A1  3/2010  Kotschenreuther et al.

FOREIGN PATENT DOCUMENTS

| EP | 2849184 A2 | 3/2015 |
| JP | S56130200 U | 10/1981 |
| JP | S5934188 A | 2/1984 |

OTHER PUBLICATIONS

Sergeev, V. Yu, et al. "Concept of the divertor of a fusion neutron source based on a spherical tokamak." Plasma physics reports 38.7 (2012): 521-539. (Year: 2012).*

(Continued)

*Primary Examiner* — Jack W Keith
*Assistant Examiner* — Joshua C Devorkin
(74) *Attorney, Agent, or Firm* — Michael Best & Friedrdich LLP

(57) ABSTRACT

A tokamak plasma vessel. The tokamak plasma vessel comprises a toroidal plasma chamber, a plurality of poloidal field coils, an upper divertor assembly, and a lower divertor assembly. The plurality of poloidal field coils are configured to provide a poloidal magnetic field having a substantially symmetric plasma core and an upper and lower null, such that ions in a scrape off lay outside the plasma core are directed by the magnetic field past one of the upper and lower nulls to divertor surfaces of the respective upper and lower divertor assembly. Each of the upper and lower divertor assembly comprises a liquid metal inlet and a liquid metal outlet located below the liquid metal inlet. Each of the upper and lower divertor assembly is configured such that in use liquid metal flows from the liquid metal inlet to the liquid metal outlet over at least one divertor surface of the divertor assembly.

10 Claims, 7 Drawing Sheets

(58) Field of Classification Search
USPC .................................. 376/133, 134, 127, 100
See application file for complete search history.

(56) References Cited

OTHER PUBLICATIONS

M. Ono et al "Recent progress in the NSTX/NSTX-U lithium programme and prospects for reactor-relevant liquid-lithium based divertor development" Nucl. Fusion 53 113030 (Year: 2013).*
Search Report issued by the United Kingdom Intellectual Property Office for Application No. 1810512.2 dated Dec. 21, 2018 (3 pages).
International Search Report and Written Opinion for Application No. PCT/GB2019/051760 dated Sep. 12, 2019 (14 pages).
Ruzic et al., "Lithium-metal infused trenches (LiMIT) for heat removal in fusion devices," Nuclear Fusion, 2011, vol. 51, 102022 (4pp).
Nagayama, "Liquid lithium divertor system for fusion reactor," Fusion Engineering and Design, 2009, vol. 84, pp. 1380-1383.

* cited by examiner

DOUBLE NULL LIQUID METAL DIVERTERS

FIELD OF THE INVENTION

The invention relates to tokamak plasma chambers, in particular to the divertors of tokamak plasma chambers.

BACKGROUND

A divertor is a device within a tokamak plasma vessel which allows for removal of waste material and power from the plasma while the tokamak is operating. The waste material naturally arises as particles diffuse out from the magnetically confined plasma core. The waste particles are a combination of the fuel (Deuterium and Tritium), fusion products (helium ash), and heavier ions released from the walls. To confine the plasma, tokamaks utilise magnetic fields. However, particles slowly and randomly diffuse out, and eventually impact one of the divertor surfaces, which are configured to withstand the high flux of ions.

A poloidal cross section through one side of an exemplary tokamak is illustrated in FIG. 1. The tokamak 100 comprises a toroidal plasma chamber 101. Poloidal magnetic field coils produce a poloidal magnetic field to confine the plasma (which is carrying a current). If there were no collisions between plasma particles, turbulence, waves or other such phenomena, then the plasma (made from charged particles) would effectively be tied to magnetic field lines (which can be represented as lines of constant poloidal flux 113). The plasma is said to be confined onto lines of constant poloidal flux inside the "plasma core" because the lines of constant flux are closed, so called "closed flux surfaces". Through collisions and other such processes, the plasma slowly diffuses out of the plasma core. The "last closed flux surface" 111 has a null point 112 at one end (usually the lower end) and defines the edge of the confined core. Flux lines 114 immediately outside the plasma core (the "scrape off layer") intersect two surfaces below the null: the outboard (i.e. radially outer) divertor surface 121 (located in this example at the bottom of a channel in the lower part of the plasma chamber), and the inboard (i.e. radially inner) divertor surface 122. Waste particles and power are deposited onto these surfaces, with the majority of the waste particles and power landing on the outboard divertor surface (the exact split between inboard and outboard depends on turbulent physics within the scrape off layer). The divertor surfaces are constructed from elements having relatively low atomic numbers (to avoid contaminating the plasma with high atomic number ions through sputtering and other such erosion processes) which are metals (to avoid tritium retention within the divertors). Suitable metals include tungsten, molybdenum, beryllium, lead-lithium or lithium.

A cross section through a second exemplary tokamak is illustrated in FIG. 2. This tokamak has a "double null" divertor. The principle of the "double null" divertor is the same as for the "single null" divertor in FIG. 1, except that nulls 211, 212 and corresponding divertor surfaces 221, 222, 223, 224 are provided at both the upper and lower edges of the plasma core 210. An advantage of the double null configuration is that the heat flux on each divertor surface is roughly half that which would be experienced by a single null configuration.

SUMMARY

According to an aspect of the present invention, there is provided a tokamak plasma vessel. The tokamak plasma vessel comprises a toroidal plasma chamber, a plurality of poloidal field coils, an upper divertor assembly, and a lower divertor assembly. The plurality of poloidal field coils are configured to provide a poloidal magnetic field having a substantially symmetric plasma core and an upper and lower null, such that ions in a scrape off layer outside the plasma core are directed by the magnetic field past one of the upper and lower nulls to divertor surfaces of the respective upper and lower divertor assembly. Each of the upper and lower divertor assembly comprises a liquid metal inlet and a liquid metal outlet located below the liquid metal inlet. Each of the upper and lower divertor assembly is configured such that in use liquid metal flows from the liquid metal inlet to the liquid metal outlet over at least one divertor surface of the divertor assembly.

DETAILED DESCRIPTION

A flowing liquid metal divertor surface can be provided by using metals which are liquid at the temperatures within the plasma vessel. Such a surface can quickly recover from transient high-heat flux events in the plasma (e.g. Edge Localised Modes, ELMs). However, flowing liquid metal divertors are difficult to provide in a double null configuration, as the liquid metal must either be provided on an upward facing surface of the divertor (whereas, for prior art double null divertors, the divertor surface for the upper divertors would be downward facing), or held on to a downward facing surface by non-gravitational means which are difficult to provide and may result in uneven flows due to "negative pressure" in the liquid metal—effectively, the liquid metal must flow "on the ceiling".

A double null divertor using flowing liquid metal can be provided if the upper divertor surfaces are not symmetrical to the lower divertor surfaces. This can be achieved either with a symmetric magnetic field, or a non-symmetric magnetic field. Using a non-symmetric magnetic field gives more design freedom to the positioning of the divertor surfaces, but adds additional complexity to the poloidal field coils, due to the need to provide the non-symmetric field outside the plasma core while still keeping the plasma core substantially symmetrical. In contrast, using a symmetric magnetic field more tightly constrains the divertor surface positions, but simplifies the design of the poloidal field coils.

Figure 1:
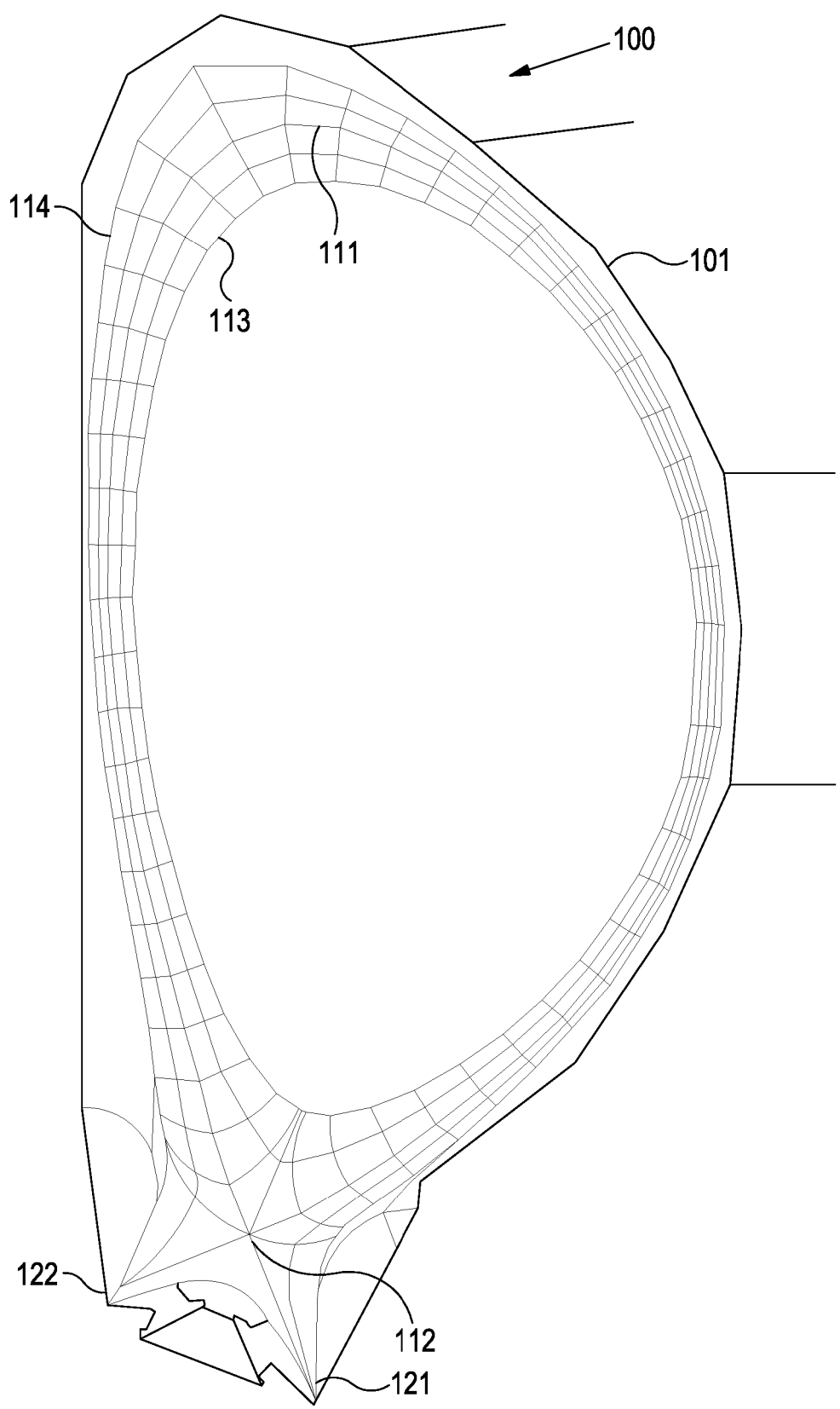
FIG. 1 is a cross section of a tokamak having a single-null divertor.
Figure 2:
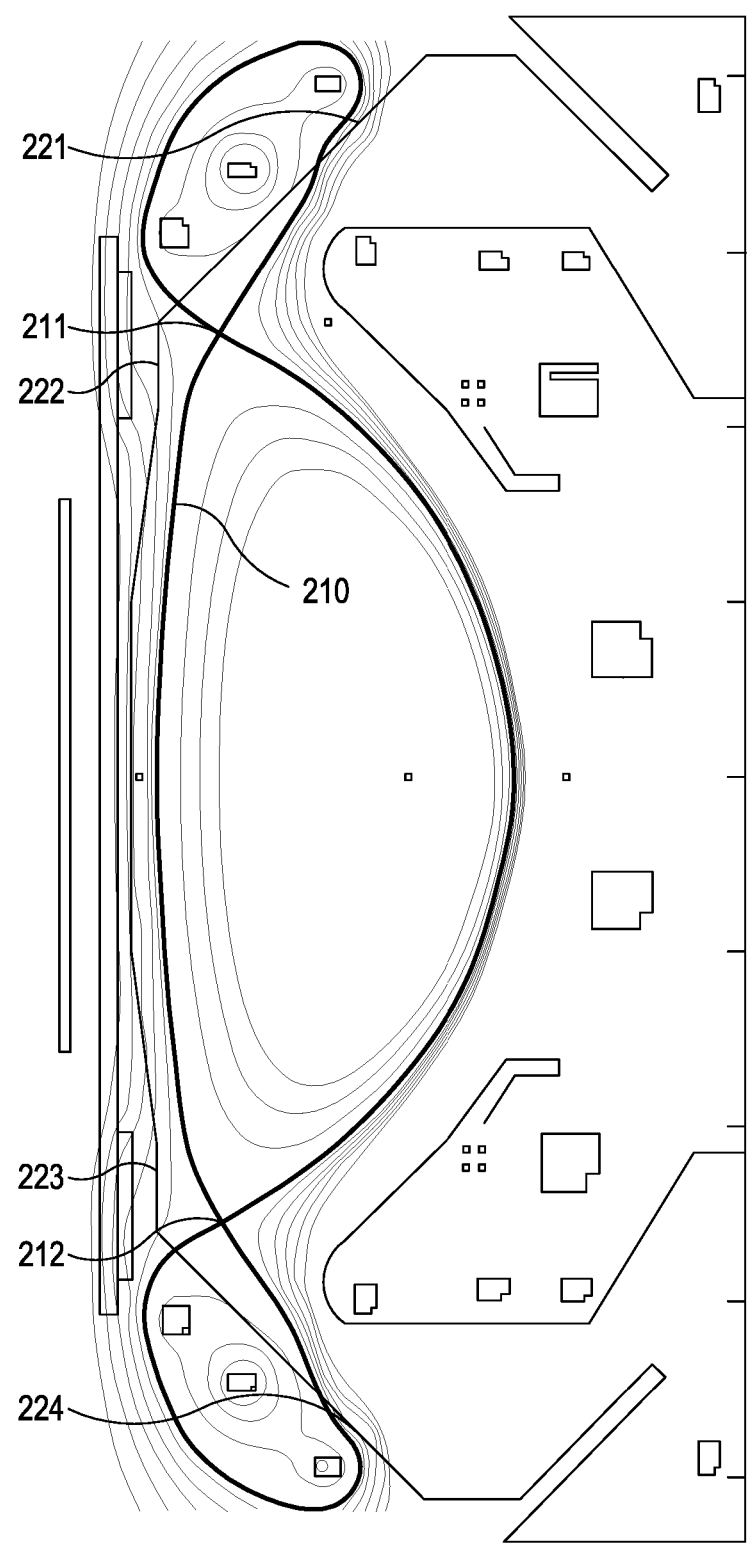
FIG. 2 is a cross section of a tokamak having a double-null divertor.
Figure 3:
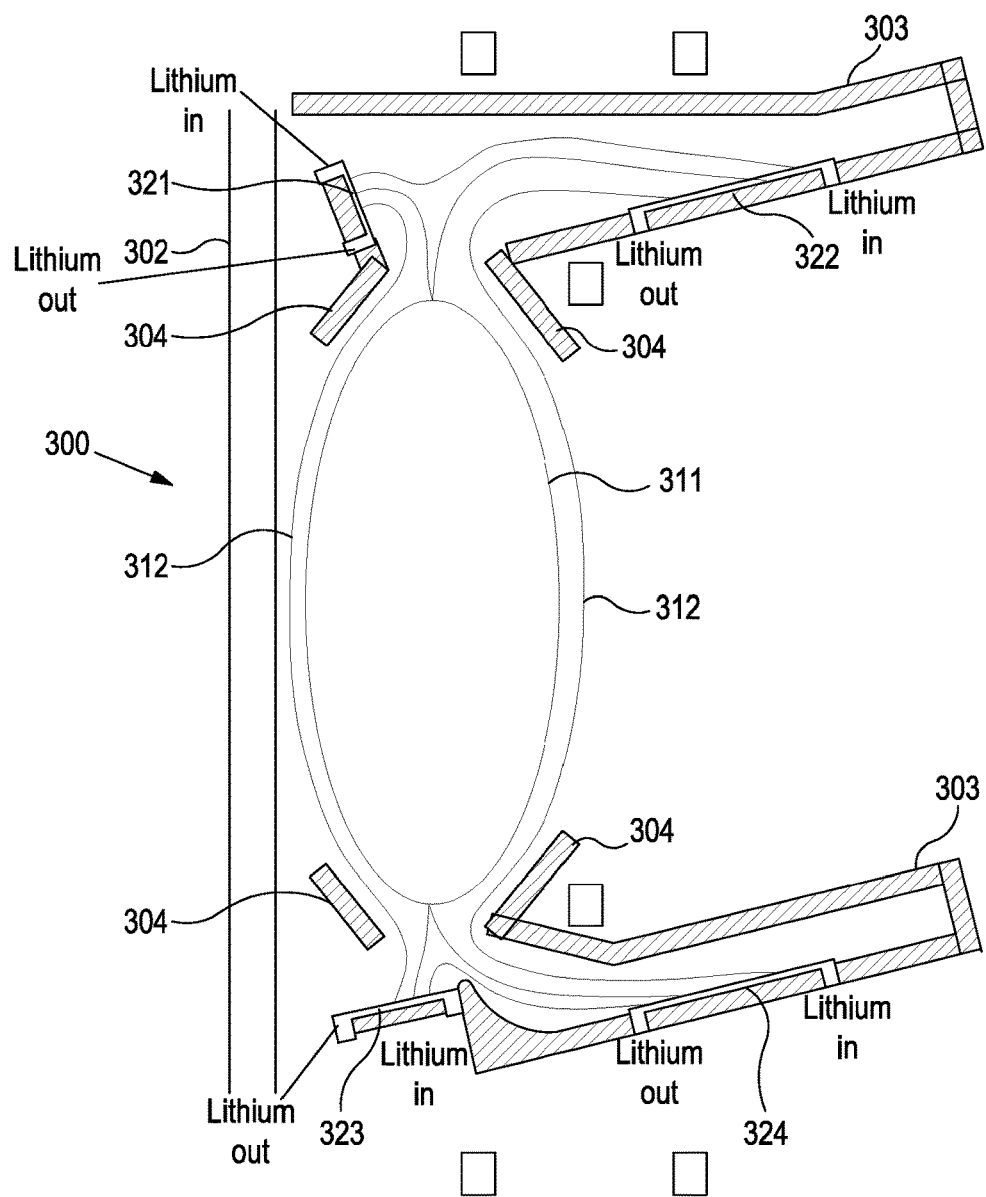
FIG. 3 is a cross section of a tokamak having liquid metal divertor surfaces.
Figure 4:
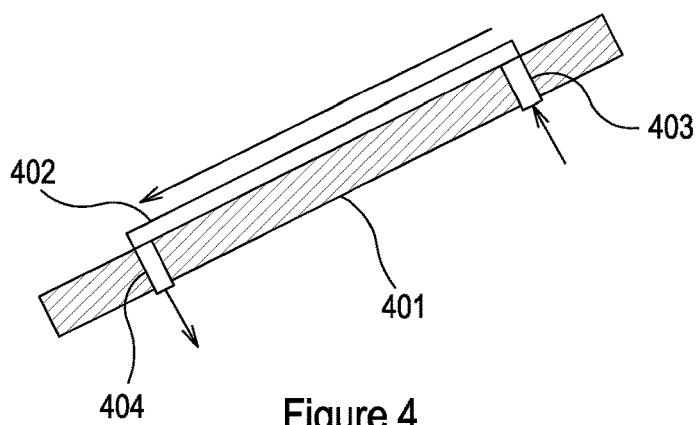
FIG. 4 is a schematic illustration of a liquid metal divertor surface.

FIG. 3 shows a cross section of an exemplary tokamak 300 having a non-symmetric magnetic field and a double null divertor with all divertor surfaces being flowing liquid metal. The tokamak 300 comprises a plasma vessel having a central column 302. The tokamak comprises poloidal field coils configured to provide a magnetic field such that the plasma core itself 311 is substantially symmetric, and such that the scrape off layer 312 is directed to each of the divertor surfaces. The divertor surfaces are the upper inboard divertor surface 321, the upper outboard divertor surface 322, the lower inboard divertor surface 323, and the lower outboard divertor surface 324. Each divertor surface has the structure shown in FIG. 4, and comprises a structural support (with cooling channels inside) 401 over which flows a liquid metal layer 402. The liquid metal layer is provided from an inlet 403, and drains into an outlet 404, with the inlet being located above the outlet such that the liquid metal flows under gravity. Further support structures 303 are provided to keep the divertor surfaces in place. The outboard divertor surfaces (which take the majority of the waste particles and power) are arranged such that they intersect the scrape off layer 312 at a shallow angle (e.g. angles of 2 degrees are widely quoted within the literature; this is set by engineering tolerances). The tokamak also includes passive stabilisation plates 304 which act to reduce the growth rate of various plasma instabilities (necessary so that the active control system can control the plasma). The optimum position of the passive plates is near the null point and so should be considered in the design of the divertor system despite performing a different function.

The angle of the liquid metal flow can range from steep to shallow. In fact, it is possible for the divertor surface to be inverted, such that it faces partially downwards. The liquid metal will flow on the underside of a surface provided that the wetting angle and surface tension of the liquid metal can counteract the gravitational force. This will depend on the angle between the surface and the vertical. There will be a critical angle for a given combination of surface, liquid metal, and flow rate above which the metal will not be able to flow on the underside (this angle may be up to 90°, at which point the liquid metal will wet even a horizontal downward facing surface). Greater angles of inversion may be achieved by increasing the wetted area of the surface (e.g. by altering the geometry of the surface, or providing channels or additional roughness on the surface), by providing a surface which has an increased wetting angle with the liquid metal, or by using a thinner liquid metal flow.

Electromagnetic forces will occur within the liquid metal during operation of the tokamak, and these can be engineered such that they will assist in counteracting the effect of gravity on the liquid metal. This may include providing a current through the liquid metal so that the interaction of the current and the magnetic field counteracts gravity.

Figure 6:
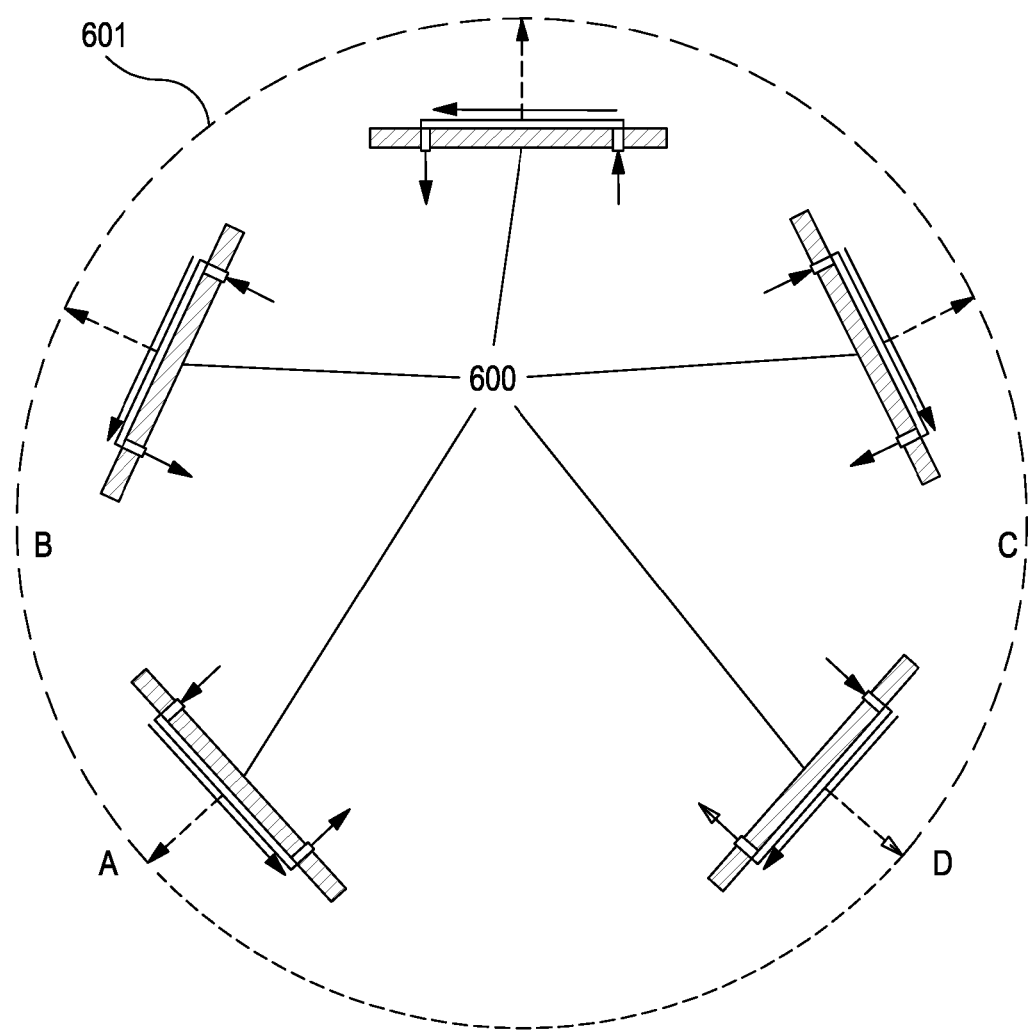
FIG. 6 is an exemplary illustration of the possible angles for a liquid divertor surface.

FIG. 6 provides an example of the acceptable angles for an exemplary divertor at a certain flow rate. The divertor 600 may be oriented at an angular range represented by the arc 601 (with the arc representing the direction of a line perpendicular to the surface). The segment of arc between points B and C is where the surface is "generally upward facing" as the term is used in the examples herein—i.e. the line perpendicular to the surface has a component which extends upwards (even if this component may be small compared to the horizontal component for a steep incline). The arcs between points A and B, and between points C and D represent examples where the surface is "generally downward facing", with an angle such that the liquid metal flow will remain on the surface despite gravity. The arc between A and D (not passing through B or C) represents the examples where the liquid metal will not be able to remain on the surface—divertors at these angles would not be suitable.

The inversion angle achievable (i.e. the angle of the surface compared to a vertical surface) for a particular configuration of surface and liquid metal may be determined by trial and error. For example, this may be done creating such a surface, affixing it to a pivot within a vacuum chamber (at similar pressure, temperature, and electromagnetic conditions to those expected in use), and flowing liquid metal over the surface over a range of angles until the liquid metal no longer adheres. Alternatively, the inversion angle achievable may be determined by appropriate simulation as known in the art—i.e. a fluid simulation that takes into account wetting and magneto-hydrodynamic effects.

The liquid metal may flow in a radially inward direction, i.e. each inlet 403 may be located radially outwards of the corresponding outlet 404. This will cause the surface area of the liquid metal to decrease along the flow (as the divertor surfaces are substantially annular—bearing in mind that FIG. 3 is a cross section through an object with cylindrical symmetry around the central column 302) this again is more important for the outboard divertor surfaces. In the absence of the magnetic field, the thickness of the liquid would increase along the flow, and this effect will occur to a lesser extent with the magnetic field. This allows the divertor to recover more quickly from a dry out (i.e. the removal of a substantial part of the liquid metal from the divertor, e.g. due to a transient high heat flux event such as an ELM). As can be seen in FIG. 3, it is particularly difficult to achieve these optional features for the inboard divertor surfaces 322 and 324 (indeed, the inboard upper divertor surface 322 has neither feature).

Figure 5:
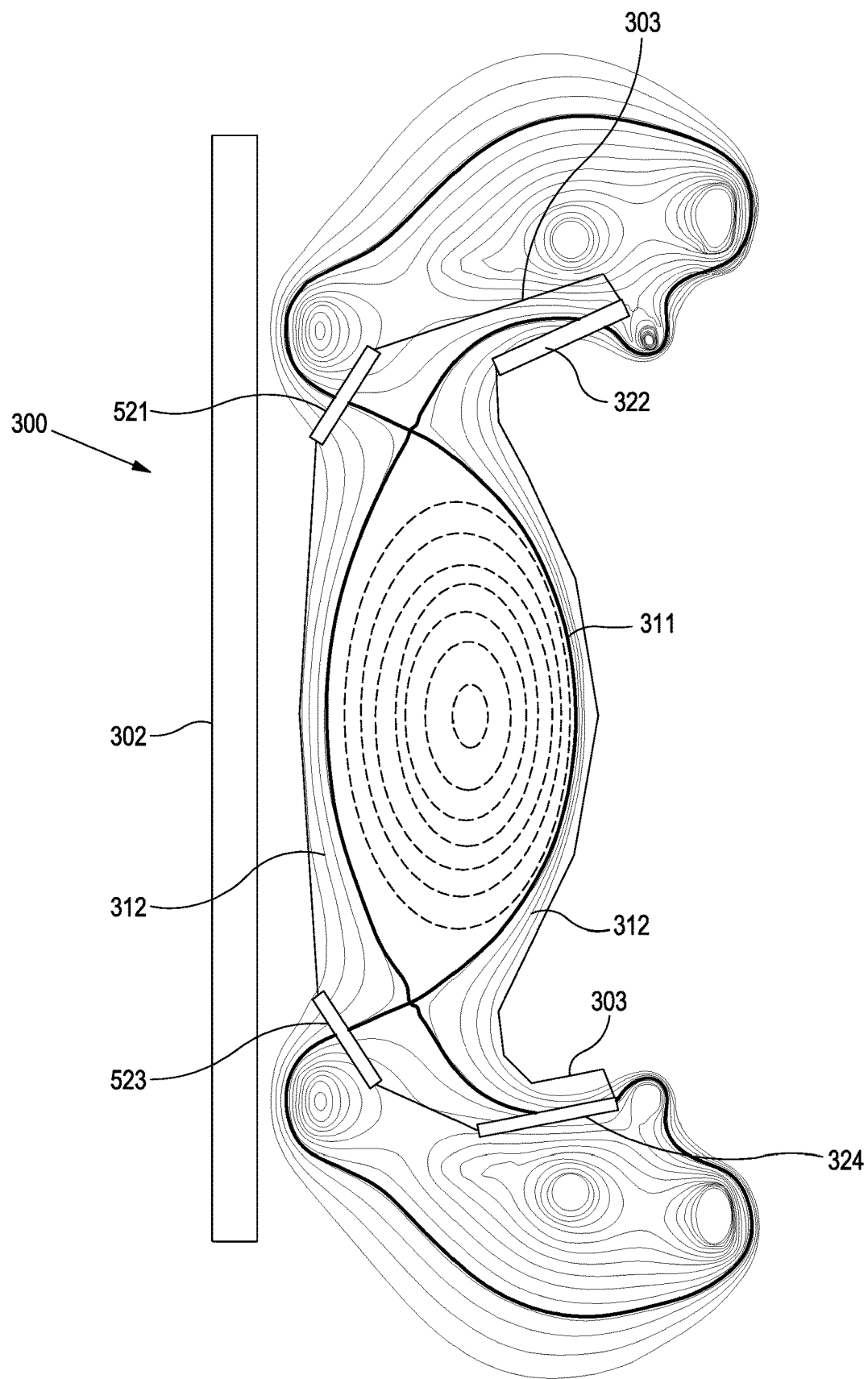
FIG. 5 is a cross section of an alternative tokamak having liquid metal outboard divertor surfaces and solid inboard divertor surfaces.

In an alternative construction, shown in FIG. 5, the poloidal magnetic field is symmetric and the inboard divertor surfaces 521, 523 may be made from solid metal (e.g. tungsten, molybdenum, or any other suitable metal known in the art), with the other features being the same as for FIG. 3. Although the solid metals are less effective than the liquid metal divertors, this is of relatively little concern for the inboard divertors as they experience considerably less heat flux than the outboard divertors. As a further alternative, only one of the upper inboard divertor surface or the lower inboard divertor surface may be made from solid metal, with the other divertor surfaces being liquid metal divertor surfaces as described above.

The use of a symmetric poloidal magnetic field does not require solid inboard divertor surfaces, or vice versa. A symmetric magnetic field may be used with liquid inboard divertor surfaces, or solid inboard divertor surfaces may be used with an asymmetric magnetic field.

Figure 7:
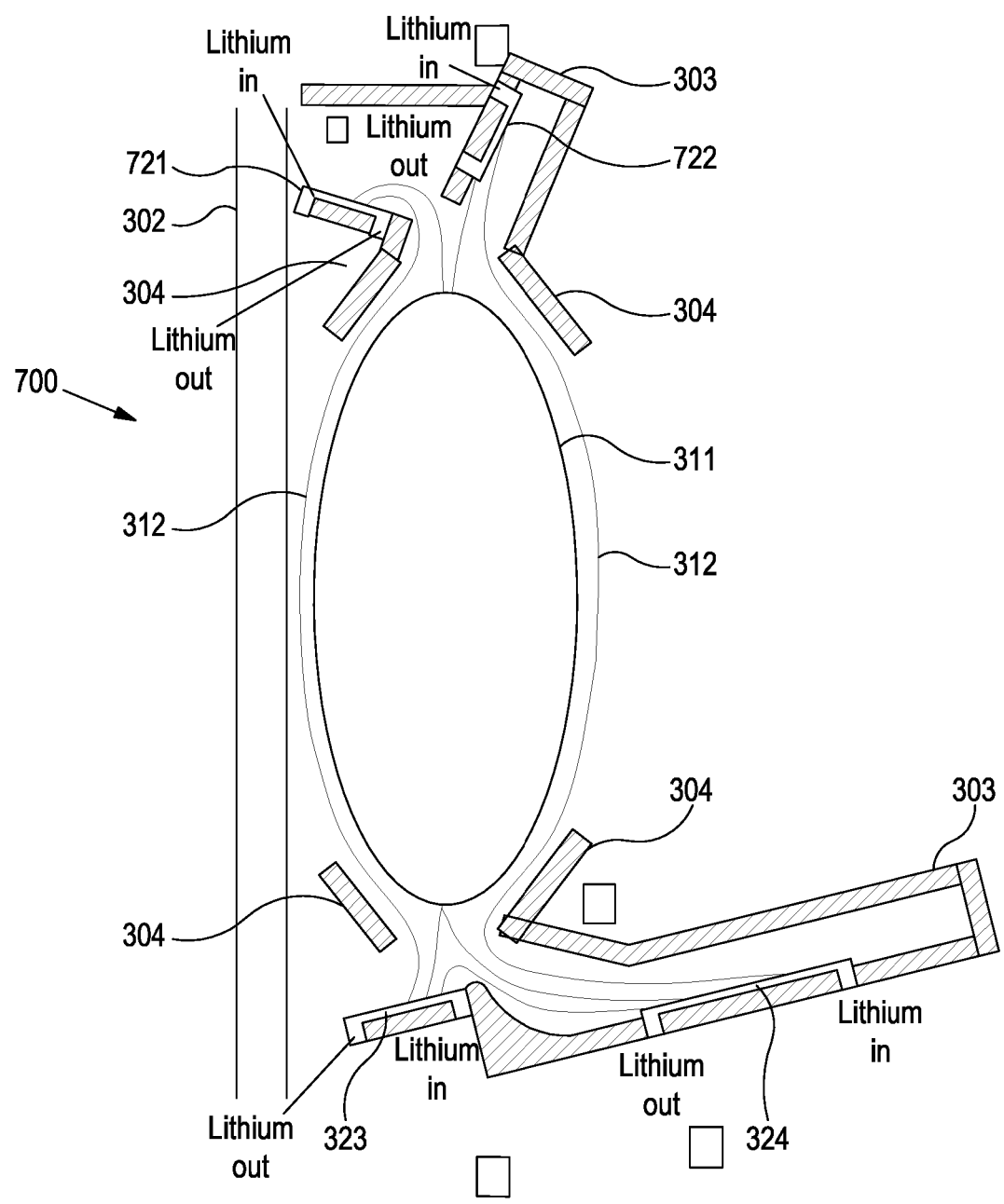
FIG. 7 is a cross section of an alternative tokamak having liquid metal divertor surfaces.

A further alternative construction is shown in FIG. 7. In this example, lower divertor surfaces 323, 324 have the same structure as in FIG. 3, but the upper divertor surfaces 721, 722 are arranged such that the upper outboard divertor surface is generally downwards facing.

Figure 8:
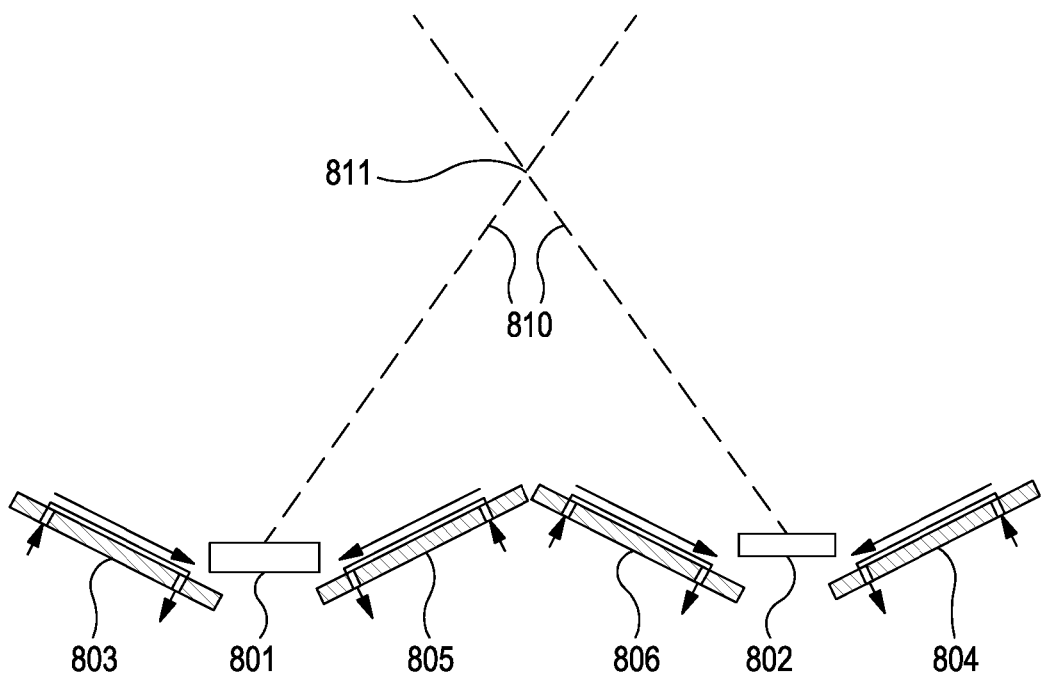
FIG. 8 is a cross section of a divertor assembly of a tokamak having liquid metal divertor surfaces.

The previous examples have assumed that the entirety of a given divertor region (e.g. the upper inboard divertor surface, or the lower outboard divertor surface) is either liquid or solid. However, this need not be the case. FIG. 8 shows a hybrid divertor (only the lower divertor surfaces are shown, but the same principle applies to a double null divertor). The divertor comprises an inboard strike point divertor surface 801, and outboard strike point divertor surface 802, an inboard far divertor surface 803, and outboard far divertor surface 804, and an inboard private divertor surface 805 and outboard private divertor surface 806.

The strike point divertor surfaces 801, 802 are solid, and are located at the "strike points"—the locations where the magnetic flux lines 810 corresponding to the null 811 strike the divertor. The far divertor surfaces 803, 804 are located in the "far-scrape off layer", i.e. inboard of the inboard strike point divertor surface and outboard of the outboard strike point divertor surface, respectively. The inboard 805 and outboard 806 private divertor surfaces are located in the "private region", i.e. between the inboard and outboard strike point divertor surfaces.

Any combination (or all) of the private and far divertor surfaces may be liquid metal divertor surfaces, as described previously. This arrangement gives a good balance of the resistance of a solid divertor surface to high heat flux (in case the peak heat flux is sufficiently high to disrupt the liquid flow), in combination with the additional particle pumping provided by the liquid metal surfaces (i.e. removing the scrape-off layer particles from the plasma). This arrangement functions because the heat flux on the divertor decays approximately exponentially with distance from the strike points—so in the case where the peak heat flux at the strike point is excessively high, liquid metal divertor surfaces may still be used further away from the strike point.

As an alternative, a single private divertor surface may be provided which spans between the inboard and outboard strike point divertor surfaces.

Figure 9:
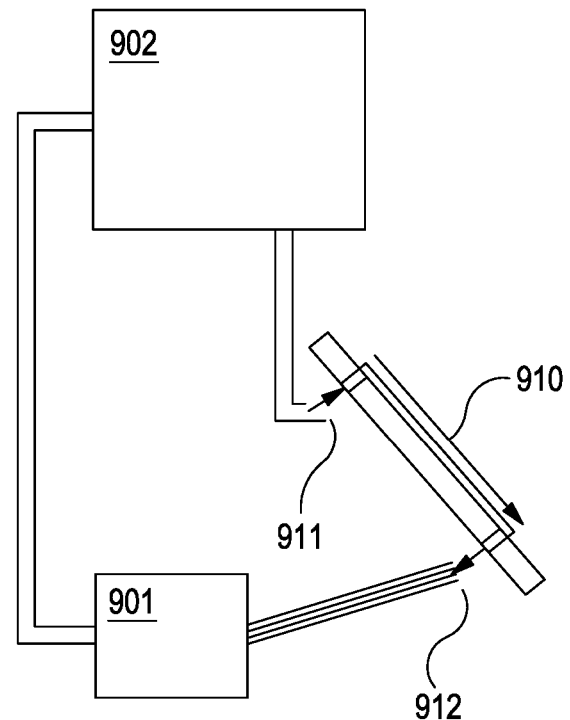
FIG. 9 is a schematic illustration of a liquid metal circulation system.

FIG. 9 is a schematic illustration of a liquid metal circulation system for use with the liquid metal divertor surfaces. The liquid metal divertor 910 has an inlet 911 and an outlet 912. The circulation system comprises a pump 901 and a reservoir 902 (plus associated conduits and valves). The reservoir 901 supplies liquid metal to the inlet 911, at a consistent flow rate, due to gravity. Liquid metal exiting the outlet 912 is raised back to the reservoir 901 via the pump 901.

Alternatively, a system which comprises a pump but not a reservoir may be used (with the pump directly supplying liquid metal from the outlet 912 to the inlet 911). In general, any liquid metal supply system which provides a consistent flow rate is suitable. In particular, when designing downward facing divertor surfaces, the flow rate will in part determine the angles at which the downward facing surface can be placed.

The liquid metal supply may be a circulation system as described above, or it may comprises a reservoir which is refilled from an external source periodically.

Cleaning and/or filtration means may be provided within the liquid metal circulation system, to clean any waste products from the liquid metal. Alternatively or additionally, the circulation system may include ports for removing liquid metal from the circulation system, and replacing it with liquid metal that does not have the waste products.

Lithium is a preferred metal for liquid metal divertor surfaces as it is the lowest atomic number element which is suitable (and therefore causes the least contamination of the plasma). As an alternative, tin or other metals with suitably low atomic number, may be used. Or a combination such as tin-lithium.

The invention claimed is:

1. A tokamak plasma vessel comprising:
a toroidal plasma chamber;
a plurality of poloidal field coils;
an upper divertor assembly;
a lower divertor assembly;
wherein the plurality of poloidal field coils are configured to provide a poloidal magnetic field having a substantially symmetric plasma core and an upper and lower null, such that ions in a scrape off layer outside the plasma core are directed by the magnetic field past one of the upper and lower nulls to divertor surfaces of the respective upper and lower divertor assembly;
wherein each of the upper and lower divertor assembly comprises:
an inboard strike point divertor surface, located at the inboard strike point;
an outboard strike point divertor surface, located at the outboard strike point;
an inboard far divertor surface, located radially inwards of the inboard strike point divertor surface;
an outboard far divertor surface, located radially outwards of the outboard strike point divertor surface; and
at least one private divertor surface, located between the inboard and outboard strike point divertor surfaces;
each far divertor surface and/or each private divertor surface comprises:
a liquid metal inlet; and
a liquid metal outlet located below the liquid metal inlet;
configured such that in use liquid metal flows from the liquid metal inlet to the liquid metal outlet over at least the respective divertor surface.

2. A tokamak plasma vessel according to claim 1, wherein the poloidal field coils are configured to provide a symmetric magnetic field.

3. A tokamak plasma vessel according to claim 1, wherein the poloidal field coils are configured to provide a magnetic field which is asymmetric outside the plasma core so as to optimize interaction with the upward facing divertor surfaces.

4. A tokamak plasma vessel according to claim 1, and comprising a liquid metal supply means configured to supply liquid metal to each liquid metal inlet at a respective flow rate.

5. A tokamak plasma vessel according to claim 1, wherein each divertor surface over which the liquid metal flows is generally upward facing.

6. A tokamak plasma vessel according to claim 4, wherein the upper divertor assembly comprises at least one divertor surface over which liquid metal flows, wherein the divertor surface is generally downward facing, and wherein that divertor surface is at an angle such that, when the liquid metal supply means supplies liquid metal to the surface at the respective flow rate, the wetting of the liquid metal to the divertor surface prevents liquid metal from falling from the divertor surface.

7. A tokamak plasma vessel according to claim 6, wherein the divertor surfaces are arranged with reflective symmetry, such that the divertor surfaces of the upper divertor assembly are a reflection of the divertor surfaces of the lower divertor assembly in an equatorial plane of the tokamak plasma vessel.

8. A tokamak plasma vessel according to claim 6, wherein the generally downward facing divertor surface comprises channels.

9. A tokamak plasma vessel according to claim 1, wherein the liquid metal inlet of at least one of the divertor surfaces is located radially outwards of the respective liquid metal outlet.

10. A tokamak plasma vessel according to claim 1, wherein the liquid metal is lithium or tin.

* * * * *